United States Patent [19]

Hotard

[11] 4,146,945
[45] Apr. 3, 1979

[54] CARCASS SPLITTING MACHINE

[76] Inventor: Septime R. Hotard, 390 NW. Bay St., Ponchatoula, La. 70454

[21] Appl. No.: 834,985

[22] Filed: Sep. 20, 1977

[51] Int. Cl.² .............................................. A22B 5/20
[52] U.S. Cl. .......................................... 17/23; 17/52; 83/801; 83/803
[58] Field of Search ............... 17/23, 52; 83/794–801, 83/803

[56] References Cited

U.S. PATENT DOCUMENTS

| 451,199 | 4/1891 | Kesseler | 83/799 X |
|---|---|---|---|
| 1,813,291 | 7/1931 | Herbold | 83/801 X |
| 1,855,391 | 4/1932 | Fagonde | 17/23 |
| 2,634,457 | 4/1953 | Moyer et al. | 17/23 |
| 3,118,337 | 1/1964 | Ferris | 83/803 X |
| 3,121,910 | 2/1964 | Wells et al. | 17/23 |
| 3,402,425 | 9/1968 | Wexel | 17/23 |
| 3,523,327 | 8/1970 | O'Neilly | 17/23 |

*Primary Examiner*—J. M. Meister
*Attorney, Agent, or Firm*—Berman, Aisenberg & Platt

[57] ABSTRACT

Apparatus for splitting one or two carcasses while the latter are held in a vertical, stationary position. The cutting means comprises a band saw arranged so as to provide two cutting edges in order that the two carcasses may be split at the same time. The band saw is supported on a frame, and means are provided for moving the band saw vertically on the frame through the carcasses.

9 Claims, 4 Drawing Figures

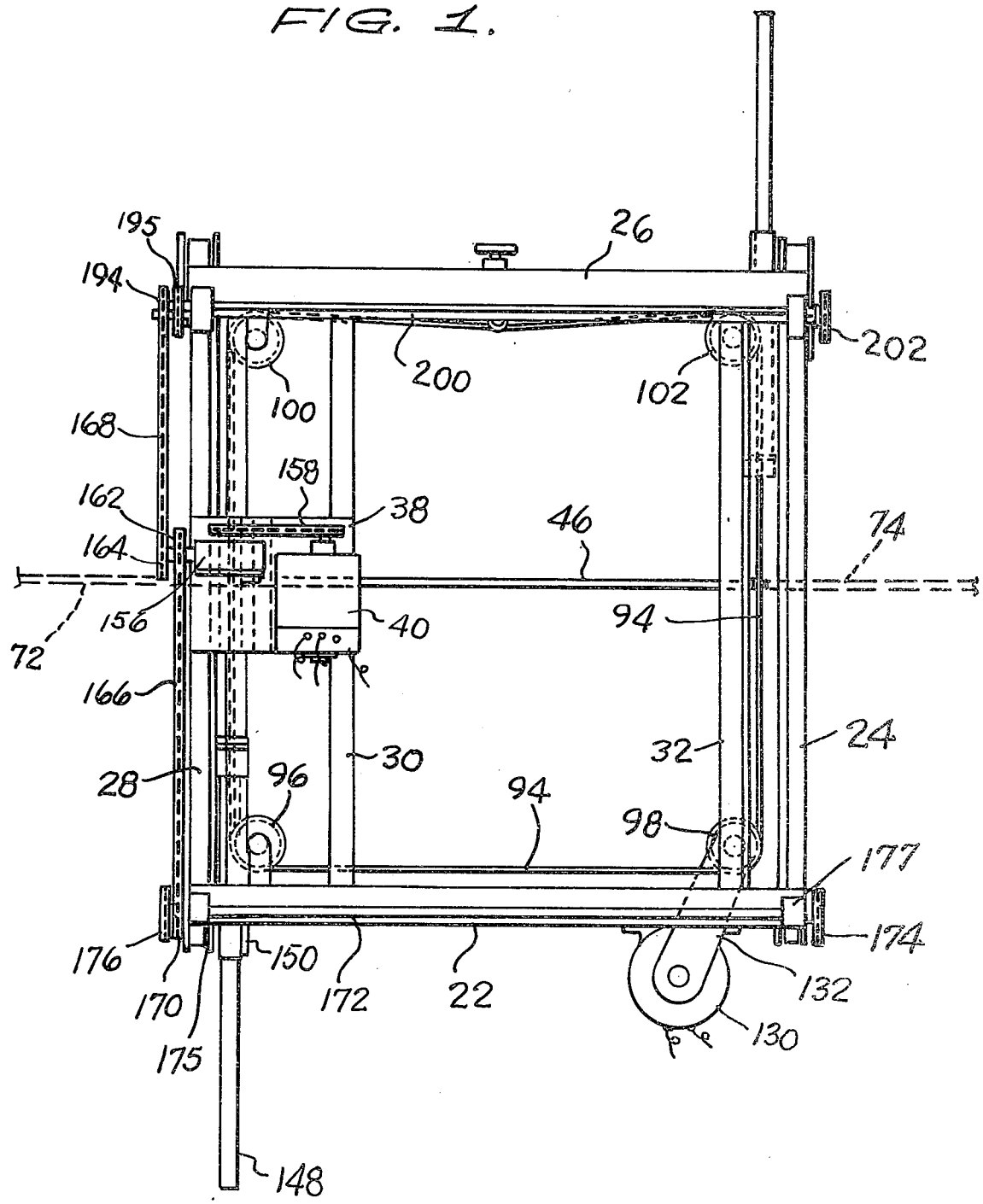

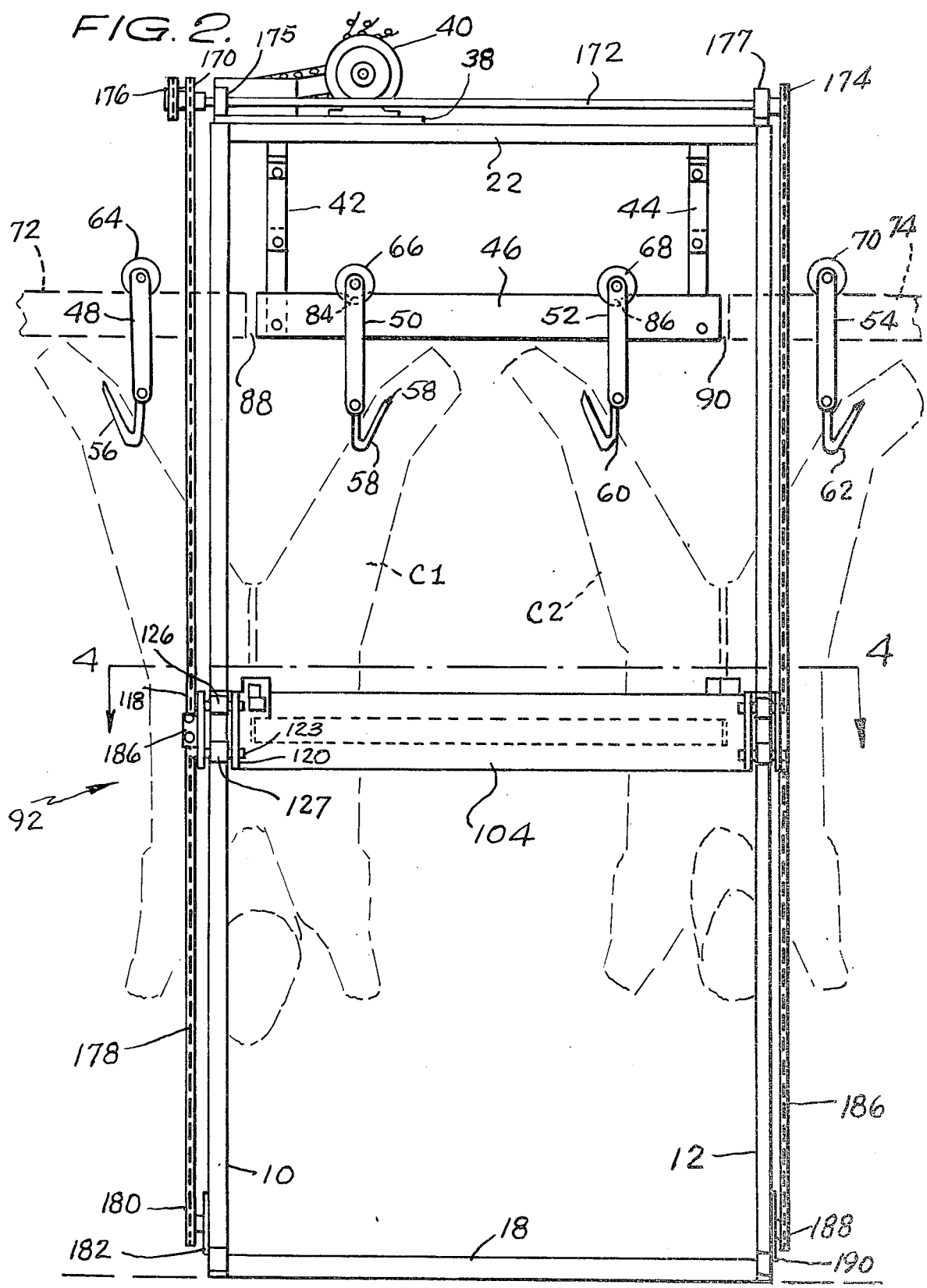

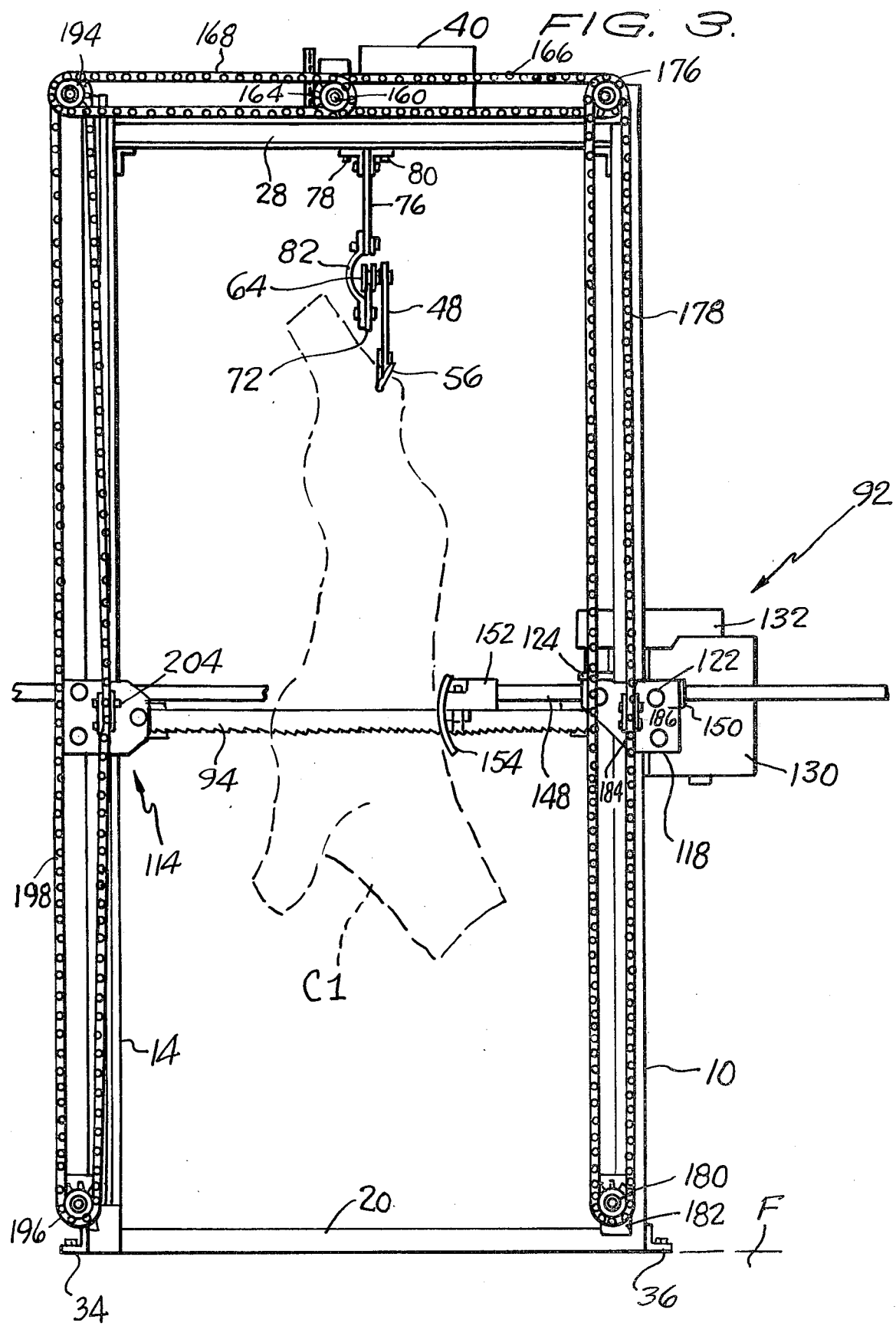

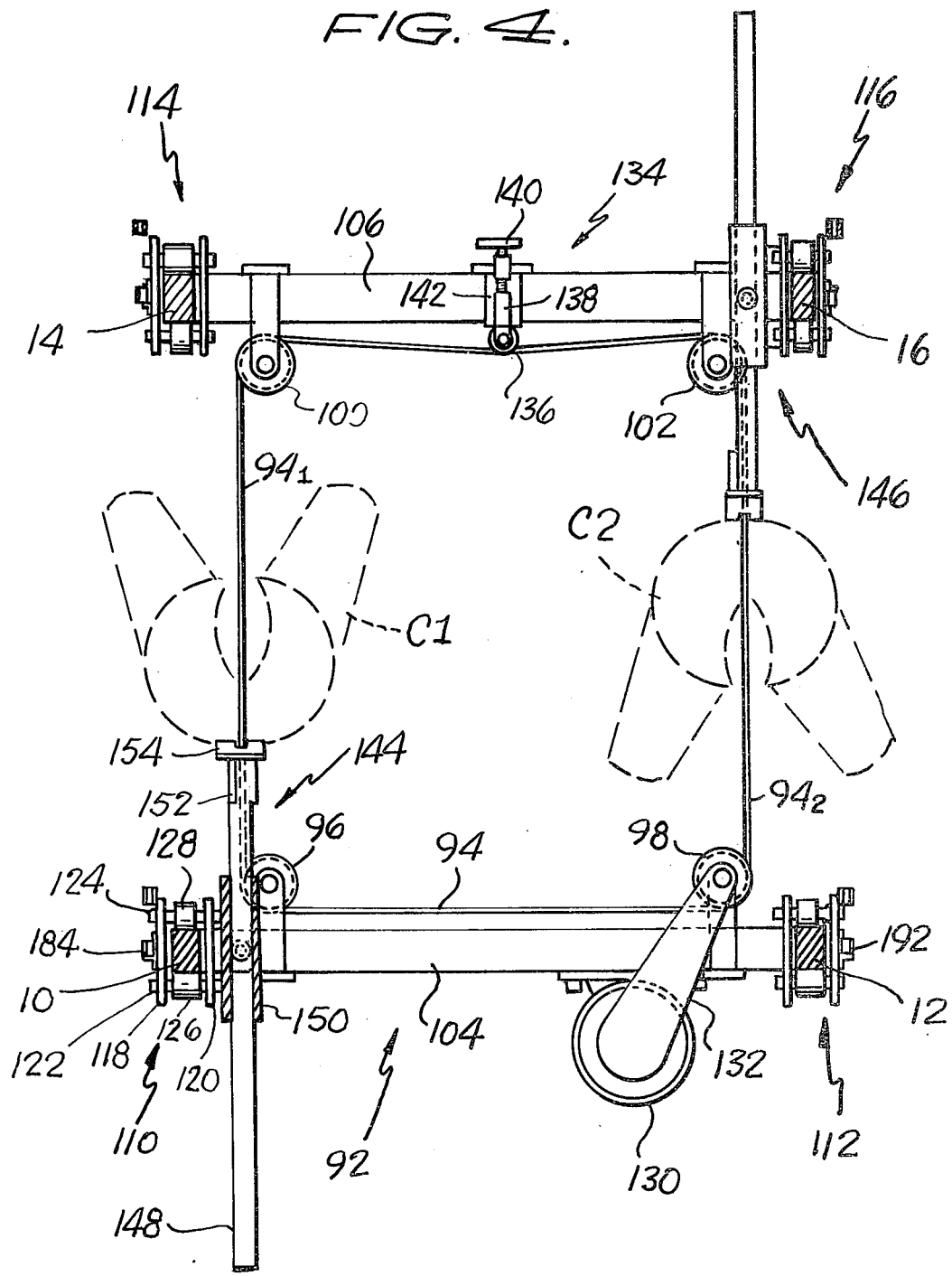

CARCASS SPLITTING MACHINE

BACKGROUND OF THE INVENTION

1. Field of the Invention

The present invention is generally related to butchering apparatus and, more particularly, is directed towards an apparatus for splitting a carcass vertically while the carcass is held stationary.

2. Description of the Prior Art

The prior art illustrates several different machines and techniques for splitting carcasses. For example, my own prior U.S. Pat. No. 2,904,826 sets forth a frame-mounted carcass splitting saw blade in which the carcass is moved upwardly relative to the stationary saw blade. The saw blade is disposed about a triangular pulley and motor arrangement, and is therefore limited to cutting a single carcass at a time.

My later U.S. Pat. No. 3,790,989 discloses a carcass splitting machine in which a band saw is disposed at a 45° angle to the direction of travel of the carcass along overhead rails. While this apparatus is also limited to cutting a single carcass at a time, it is nevertheless valuable for its teaching of a carcass splitting machine which may be adapted to and made part of mass production techniques.

Other U.S. patents in this general art area of which I am aware include: Nos. 701,345; 2,711,196; 3,523,327; and 3,995,350. The first-named patent to Hughes (701,345) teaches a non-reciprocating knife which is movable vertically through a single carcass; Daniel (2,711,196) teaches a slotted guide 44 through which band 16 passes; O'Neilly (3,523,327) teaches a vertically movable saw for splitting a carcass which, however, requires an operator for manually controlling same; while Ekstam (3,995,350) generally sets forth an apparatus for splitting carcasses in which the slaughtered carcasses arrive on an overhead suspension track and are suspended vertically prior to passage through the apparatus.

While each of the above-identified references set forth a machine which may have its own unique advantages, none of the foregoing references teaches or suggests a fully automatic dual-carcass splitting machine which may be readily incorporated into a mass production slaughterhouse, in the manner to be described in more detail hereinafter.

OBJECTS AND SUMMARY OF THE INVENTION

It is therefore a general object of the present invention to provide a new, improved and unique carcass splitting machine which overcomes any and all of the deficiencies noted above with respect to the prior art devices.

Another object of the present invention is to provide a novel and unique carcass splitting machine which is fully automatic in that no manual operator intervention is required, and which may be readily incorporated into existing slaugherhouses.

An additional object of the present invention is to provide a carcass splitting machine which enables two carcasses to be split at the same time.

A still further object of the present invention is to provide a carcass splitting machine which employs a saw band that uniquely travels through a stationary carcass in order to split same, and which may be further adapted to split two carcasses on the same downward stroke of the saw band.

Another object of the present invention is to provide a carcass splitting machine which holds the carcasses to be split stationary prior to cutting, thereby enabling a more perfect cut to be made.

The foregoing and other objects are attained in accordance with one aspect of the present invention through the provision of apparatus for cutting carcasses, which comprises a frame, means coupled to the frame for supporting at least one carcass, a band saw, means coupled to the frame for supporting the band saw, means for driving the band saw, and means for moving the band saw supporting means along the frame so as to split the carcass.

More particularly, the carcass supporting means comprises means for stationarily supporting the carcass against vertical movement as the band saw supporting means moves along the frame. The carcass supporting means may include means for supporting two carcasses, the band saw supporting means operative so as to split the two carcasses substantially simultaneously.

In accordance with more specific aspects of the present invention, the frame includes vertical support members to which the band saw supporting means are movably coupled, and the band saw is oriented substantially horizontally by its supporting means. The carcass supporting means comprises a guide rail supported by the frame and having a pair of spaced openings therein for permitting passage of the band saw therethrough. The guide rail is adapted to receive roller carriers from which the carcass or carcasses are supported, the guide rail including means formed therein for positioning the roller carriers thereon at predetermined locations.

In accordance with more specific objects of the present invention, the vertical support members include two pair of forward and rearward spaced frame members. The band saw supporting means includes a front support member coupled between the pair of lower frame members and a rear support member coupled between the pair of rearward frame members. The band saw supporting means more particularly comprises four pulleys which are disposed adjacent the ends of the front and rear support members and about which the band saw is endlessly disposed. The means for driving the band saw is connected to one of the support members, while means for adjusting the tension of the band saw is coupled to the other of said support members.

In accordance with other aspects of the present invention, means are connected to the band saw supporting means for stabilizing the band saw and the carcass during the splitting of the latter. The stabilizing means more particularly comprises at least one support bar that extends parallel to the band saw and having a bifurcated guide connected to one end thereof. The guide is positioned on both sides of the band saw, and its outer surface is adapted to contact a carcass during the splitting thereof.

BRIEF DESCRIPTION OF THE DRAWINGS

Various objects, features and attendant advantages of the present invention will be more fully appreciated as the same becomes better understood from the following detailed description of the present invention when considered in connection with the accompanying drawings, in which:

FIG. 1 is a top view of a preferred embodiment of a carcass splitting machine according to the present invention;

FIG. 2 is a front view in elevation of the preferred embodiment of the carcass splitting machine of the present invention;

FIG. 3 is a side view in elevation of the carcass splitting machine illustrated in FIG. 2; and FIG. 4 is a cross-sectional view of the preferred embodiment illustrated in FIG. 2 and taken along line 4—4 thereof.

DETAILED DESCRIPTION OF THE PREFERRED EMBODIMENT

Referring now to the drawings, wherein like reference numerals indicate identical or corresponding parts throughout the respective views, and more particularly to FIGS. 2 and 3 thereof, there is illustrated in front and side views, respectively, a preferred embodiment of a carcass splitting machine according to the present invention.

The preferred embodiment of the invention includes a frame which forms a substantially rectangular solid. The frame includes forward vertical frame members 10 and 12, and rear vertical frame members 14 and 16, which are mutually parallel. The vertical frame members 10, 12, 14 and 16 are connected at their lower ends by lower horizontal frame members 18 and 20. Although four such lower horizontal frame members are provided for, only two are illustrated in these drawings.

The vertical frame members 10, 12, 14 and 16 are interconnected at their upper ends by upper horizontal frame members 22, 24, 26 and 28 which are best illustrated in FIG. 1. Extending between the front and rear upper horizontal frame members 22 and 26 and between and parallel to the side upper horizontal frame members 24 and 28 are a pair of additional upper horizontal frame members 30 and 32. The entire frame structure may be bolted or otherwise secured to the floor F of a slaughterhouse by means of, for example, brackets 34 and 36 (FIG. 3).

Mounted on top of upper horizontal frame members 28 and 30 is a horizontal support plate 38 upon which is mounted a reversible motor 40 which is connected to a suitable power source and control (not shown). Although but a single reversible motor 40 is illustrated, it should be understood that same may be replaced by a pair of motors.

As illustrated more particularly in FIG. 2, extending downwardly from the underside of plate 38 is an elongated vertical support 42 which is positioned parallel to and spaced from a similar elongated vertical support 44, the latter of which is secured to the underside of upper horizontal frame member 32. Vertical supports 42 and 44 have connected at their lower ends a horizontal guide rail 46 which is adapted to be placed within a cut away section of a slaughterhouse guide rail, represented by end portions 72 and 74.

A plurality of carcass carriers 48, 50, 52 and 54 are adapted to be moved along guide rails 72, 46 and 74 so as to move carcasses C1 and C2 through the frame of the present invention. Each of the carcass carriers include a hook 56, 58, 60 and 62 extending from the lower portion thereof, and a set of double rollers 64, 66, 68 and 70 for riding over the rails 72, 46 and 74.

The end of rail 72 adjacent to guide rail 46 is supported by an additional vertical support member 76 (FIG. 3) which is secured to the underside of the upper horizontal frame member 28 by a pair of bolted brackets 78 and 80. To the lower end of vertical support 76 is connected a bowed member 82 for accommodating the rollers 64 of carcass carrier 48. A similar additional support (not shown) is also provided for the end of rail 74 which is adjacent the distal end of rail 46. This additional support is connected to the underside of upper horizontal frame member 24.

Referring back to FIG. 2, the guide rail 46 is seen to include a pair of small, arcuate depressions 84 and 86 which serve as positioning means for the rollers of the carcass carriers. For example, as illustrated in FIG. 2 rollers 66 and 68 have come to rest in depressions 84 and 86, respectively, which enables carcasses C1 and C2 to be properly stationarily positioned with respect to the band saw cutting means, in a manner to be described in more detail hereinafter.

FIG. 2 also clearly illustrates a pair of gaps 88 and 90 between the adjacent ends of aligned guide rails 72, 46 and 74 to permit passage of the band saw therebetween, to be described in more detail below.

The reversible motor 40 stationarily mounted on the support plate 38 controls the upward and downward movement of a band saw cutting means which is indicated generally by reference numeral 92. As clearly illustrated in FIG. 4, the band saw cutting means 92 includes an endless band saw 94 which is disposed about four rectangularly positioned pulleys 96, 98, 100 and 102. Pulleys 96 and 98 are mounted on a front movable band saw support 104, while pulleys 100 and 102 are mounted near the respective ends of a rear movable band saw support 106. At the end of front and rear supports 104 and 106 are positioned four roller bearing assemblies 110, 112, 114 and 116 for permitting vertical movement of the band saw cutting means 92 along the vertical frame members 10, 12, 14 and 16.

Each of the roller bearing assemblies 110, 112, 114 and 116 are of substantially identical construction. For example, bearing assembly 110 includes a pair of support plates 118 and 120 which support three shafts 122, 123 and 124 therebetween. Mounted on the shafts 122, 123 and 124 are three rollers 126, 127 and 128 (see also FIG. 2) which form a roller bearing for the end of support 104 about vertical frame member 10.

Secured to the front band saw support 104 is a band saw drive motor 130 which is coupled to a drive pulley 98 via a drive belt 132, which is preferably enclosed.

Secured to the rear band saw support 106 is a saw blade tensioner indicated generally by reference numeral 134. Saw blade tensioner 134 includes an outer roller 136 for contacting the saw blade 94. Roller 136 may be adjusted outwardly or inwardly by means of a threaded shaft 138 controlled by a knob 140, the entire apparatus being secured to support 106 by a mounting bracket 142.

Associated with the diagonally opposite roller bearing assemblies 110 and 116 are a pair of carcass stabilizer assemblies indicated generally by reference numerals 144 and 146. The carcass stabilizer assemblies 144 and 146 are designed to hold the carcasses C1 and C2 in proper position against the force exerted by the band saw blade 94 during operation. The stabilizer assemblies 144 and 146 are substantially identical in construction, and stabilizer 144 is seen to include an elongated guide arm 148 which extends through and is supported by a guide 150 that is connected to the horizontal support post 104. At the forward end of arm 148 is mounted an upper support 152 (FIGS. 3 and 4) from the forward portion of which extends a curved, bifurcated finger support 154 through which blade 94 passes in operation and against the forward surface of which the carcass C1 being split is positioned. Assembly 146 stabilizes carcass C2 in substantially the same manner.

The manner of moving the band saw cutting means 92 vertically will now be set forth with reference to FIGS. 1 and 3. The output of the reversible motor 40 is coupled to a gearbox 156 by means of a belt, cable, chain or like drive device 158. Box 156 turns a shaft 160 upon which are mounted a pair of sprocket wheels 162 and 164. The sprocket wheels 162 and 164 respectively drive a pair of chains 166 and 168.

Chain 166 in turn drives a sprocket wheel 170 which is connected to one end of a shaft 172 which is supported on top of upper horizontal frame member 22 by a pair of support bearings 175 and 177. At the other end of shaft 172 is mounted sprocket wheel 174, while a third sprocket wheel 176 is positioned adjacent sprocket wheel 170. Sprocket wheel 176 drives a chain 178 which is vertically disposed along vertical frame member 10. To the lower end of frame member 10 is mounted a sprocket wheel 180 for receiving chain 178. Sprocket wheel 180 is mounted to frame member 10 by a mounting plate 182.

The vertically disposed drive chain 178 is fastened as at 184 to a bracket 186 which extends from the side of plate 118 of the roller bearing assembly 110. Clearly, as motor 40 is actuated, the motion is transmitted through chains 158, 166 and 178 so as to move the roller bearing assembly 110 therewith.

The sprocket wheel 174 mounted on the distal end of shaft 172 drives another vertically disposed chain 186 whose lower end is secured by a sprocket wheel 188 secured by mounting plate 190 to the lower portion of vertical frame member 12. Chain 186 is connected to roller bearing assembly 112 as at 192 in a fashion similar to that just described.

The chain 168 driven off the sprocket wheel 164 from motor 40 operates in a similar, substantially simultaneous manner to control the vertical movement of the roller bearing assemblies 114 and 116. More particularly, chain 168 drives a sprocket wheel 194 which is secured to a shaft 200 for rotating same. Also disposed on shaft 200 are a pair of sprocket wheels 195 and 202 for respectively driving a pair of vertical chains, chain 198 being illustrated in FIG. 3. A cooperating sprocket 194 is mounted to the lower portion of vertical frame member 14. Chain 198 is connected to roller bearing assembly 114 as at 204.

In operation, the motor 40 is initially actuated to bring the band saw cutting assembly 92 to its uppermost position where it lies above guide rails 72, 46 and 74. Either one or two carcasses C1 and C2 are then rolled to the appropriate position within the frame, defined by depressions 84 and 86, by means of the carcass roller carriers 48, 50, 52 and 54. The drive motor 130 for the band saw 94 is then actuated, and motor 40 is then operated to lower the assembly 92. As may be appreciated from FIGS. 2 and 4, the portions $94_1$ and $94_2$ of the band saw 94 are disposed in perfect alignment with the center of the carcasses C1 and C2. As the assembly 92 moves downwardly to intersect the carcasses C1 and C2, the stabilizing assemblies 144 and 146 are moved into contact with the respective carcasses, and the same are split substantially simultaneously, and perfectly down the middle.

Obviously, numerous modifications and variations of the present invention are possible in light of the above teachings. For example, while roller bearings have been illustrated as the means for moving the cutting assembly vertically on the frame, clearly equivalent structures, such as cogs, sleeved posts, and the like, may be used. Equivalent forms of power, such as hydraulic pressure or the like, may be substituted for the electric motors, and the chain drive may be replaced with steel ropes or the like. It is therefore to be understood that within the scope of the appended claims the invention may be practiced otherwise than as specifically described herein.

I claim as my invention:

1. Apparatus for cutting carcasses, which comprises:
a frame;
means for supporting at least one carcass;
a band saw;
means coupled to said frame for supporting said band saw;
means for driving said band saw;
means for moving said band saw supporting means along said frame so as to split said carcass;
wherein said frame includes vertical support members to which said band saw supporting means are movably coupled, said band saw being oriented substantially horizontally by its supporting means; and
wherein said carcass supporting means comprises a guide rail supported by said frame and having a pair of spaced openings therein for permitting passage of said band saw therethrough.

2. The carcass cutting apparatus as set forth in claim 1, wherein said carcass supporting means comprises means for stationarily supporting said carcass against vertical movement as said band saw supporting means moves along said frame.

3. The carcass cutting apparatus as set forth in claim 1, wherein said carcass supporting means includes means for supporting two carcasses, and said moving means operates to move said band saw supporting means so as to split said two carcasses substantially simultaneously.

4. The carcass cutting apparatus as set forth in claim 1, wherein said guide rail is adapted to receive roller carriers from which said carcass is supported, said guide rail including means formed therein for positioning said roller carriers thereon at predetermined locations.

5. The carcass cutting apparatus as set forth in claim 1, wherein said vertical support members include two pair of forward and rearward parallel spaced frame members, said band saw supporting means including a front support member coupled between said pair of forward frame members and a rear support member coupled between said pair of rearward frame members.

6. The carcass cutting apparatus as set forth in claim 5, wherein said band saw supporting means comprises four pulleys disposed adjacent the ends of said front and rear support members and about which said band saw is endlessly disposed.

7. The carcass cutting apparatus as set forth in claim 6, wherein said means for driving said band saw is connected to one of said support members, and further comprising means for adjusting the tension of said band saw coupled to one of said support members.

8. Apparatus for cutting carcasses, which comprises:
a frame;
means for supporting at least one carcass;

a band saw;

means coupled to said frame for supporting said band saw;

means for driving said band saw;

means for moving said band saw supporting means along said frame so as to split said carcass; and means connected to said band saw supporting means for stabilizing said band saw and said carcass during the splitting of the latter;

said stabilizing means comprising at least one support bar extending parallel to said band saw and a bifurcated guide connected to one end of said bar and positioned on both sides of said band saw, the outer surface of said guide adapted to contact said carcass during splitting thereof.

9. Apparatus for cutting two carcasses at a time, which comprises:

a frame;

means for supporting two carcasses from said frame;

a band saw arranged to define two cutting edges for respectively splitting said two carcasses; and means for moving said band saw through said two carcasses at the same time;

wherein said carcass supporting means includes a guide rail supported by said frame and having a pair of spaced openings therein for permitting passage of said band saw therethrough.

* * * * *